United States Patent [19]
Klein et al.

[11] 3,805,034
[45] Apr. 16, 1974

[54] METHOD OF AND APPARATUS FOR MEASURING ANGULAR ACCELERATION

[75] Inventors: Hans-Christof Klein, Hattersheim; Günther Werner, Oberstedten, both of Germany

[73] Assignee: Alfred Teves GmbH, Frankfurt/Main, Germany

[22] Filed: Jan. 25, 1971

[21] Appl. No.: 109,357

Related U.S. Application Data

[63] Continuation-in-part of Ser. No. 760,894, Sept. 19, 1968, Pat. No. 3,594,555.

[52] U.S. Cl....... 235/150.24, 73/517 A, 303/21 EB, 303/21 CG, 324/162, 324/166
[51] Int. Cl............................................. G06g 7/78
[58] Field of Search ....... 235/183, 150.24; 307/309; 310/DIG. 3, 10, 46; 338/32; 303/21 CG; 324/162, 166

[56] References Cited
UNITED STATES PATENTS

| 3,594,555 | 7/1971 | Klein et al. ................. 235/150.24 |
| 3,184,620 | 5/1965 | Leibowitz et al. ................. 310/10 X |
| 3,649,569 | 8/1953 | Pearson .......................... 307/309 X |
| 2,828,396 | 3/1958 | Forman et al. ........................ 338/32 |
| 2,924,633 | 2/1960 | Sichling et al. ....................... 338/32 |
| 3,018,395 | 1/1962 | Carlstein........................ 310/DIG. 3 |
| 3,187,254 | 6/1965 | Wasserman........................... 338/32 |
| 3,189,762 | 6/1965 | Galpin ............................. 307/309 |
| 3,309,642 | 3/1967 | Grancoin............................. 338/32 |

*Primary Examiner*—Felix D. Gruber
*Attorney, Agent, or Firm*—Karl F. Ross; Herbert Dubno

[57] ABSTRACT

In order to measure angular acceleration, two sine-wave signals $U_1$ and $U_2$ in 90° out-of-phase relationship and of a frequency determined by the angular velocity are generated by a rotating magnetic body, preferably a vehicle wheel, using Hall-effect output elements. These signals $U_1$ and $U_2$, and their time derivatives are combined to produce an output corresponding to the second time derivative of angular displacement $\ddot{\phi}(t)$ (i.e. angular acceleration) in accordance with the relationship:

$$\ddot{U}_2 \cdot \dot{U}_1 - \ddot{U}_1 \cdot \dot{U}_2 = m^2 \ddot{\phi}(t)$$

where $m^2$ is a constant. The output controls an antiskid system for the brake.

10 Claims, 6 Drawing Figures

PATENTED APR 16 1974 3,805,034

Hans-Christof Klein
Günther Werner
INVENTORS.

BY

Karl F. Ross
Attorney

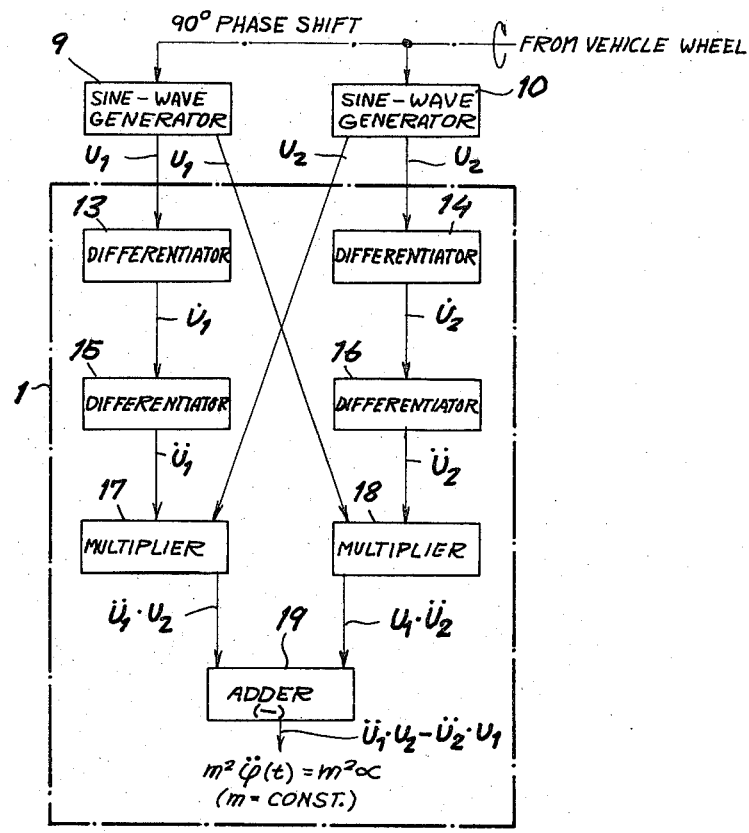
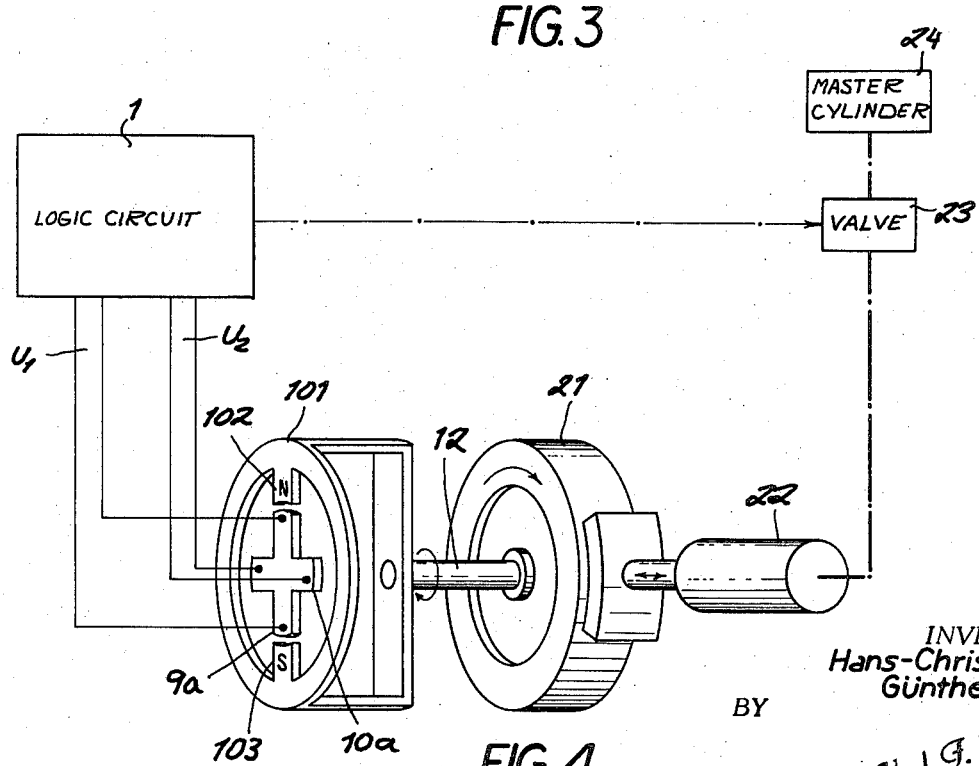

METHOD OF AND APPARATUS FOR MEASURING ANGULAR ACCELERATION

CROSS-REFERENCE TO COPENDING APPLICATION

This application is a continuation-in-part of application Ser. No. 760,894 filed 19 Sept. 1968 (now U.S. Pat. No. 3,594,555).

FIELD OF THE INVENTION

Our present invention relates to a method of and an apparatus for the measurement or computation of the angular acceleration of a rotating body and, more particularly, to such systems as are applied to the measurement of the angular acceleration of a vehicle wheel for controlling braking force and preventing locking of the wheels.

BACKGROUND OF THE INVENTION

Due to the increasing size and speed of today's motor vehicles, and their increasing numbers, rendering traffic more dangerous daily, brake systems often are equipped with antiskid regulating arrangements. These arrangements regulate the braking force in relation to the angular acceleration or deceleration of the vehicle wheels to prevent the vehicle wheels from locking and, therefore, braking inefficiently or throwing the vehicle into a skid.

Such arrangements have heretofore depended upon accelerometers rotationally driven by or with the vehicle wheel. These accelerometers all contained some parts greatly liable to wear (brushes, sliprings or the like) which are also disadvantageous since they can become fouled thereby making the whole arrangement inoperative. In addition, these devices are often highly inaccurate due to near total reliance or mechanical measuring means.

OBJECTS OF THE INVENTION

It is an object of our invention to provide an improved method of accurately measuring or computing angular acceleration independent of wear-and dirt-sensitive devices connected to the vehicle wheel.

Another object of this invention is to provide an input representing angular acceleration which can be used to operate an antiskid system of the character described.

SUMMARY OF THE INVENTION

These objects are attained, according to a feature of our invention, by rotatably driving a sinewave generator with the vehicle wheel to produce two out-of-phase (by 90°) sinewave signals whose frequencies are proportional to the angular velocity of the wheel. The invention makes use of the fact that 90° out-of-phase sinewaves correspond to the sine and cosine functions of the same signal wave. To minimize wear as much as possible, this generator comprises two similar magnetic members mounted on a common axis at an angular offset of 90° with respect to the other. Thus only the shaft bearings which must be present in any event are liable to wear and fouling, a sizeable advantage over the prior-art devices.

A further feature of our invention is the provision of a logic circuit which, using the fact that the signals always have the same phase relationship but varying frequencies, computes the angular acceleration through use of the relationship:

$$\dot{U}_1 \cdot U_2 - \dot{U}_2 \cdot U_1 = m^2 \ddot{\phi}(t)$$

wherein $U_1$ is an amplitude of one signal, $U_2$ is the corresponding amplitude of the other and $\ddot{\phi}(t)$ is the second derivative of angular displacement with respect to time and, therefore, the angular acceleration $\alpha$. $m^2 (= U_1^2 + U_2^2)$ is merely a constant dependent on the voltage, resistance, or current amplitudes in which the signals are evaluated.

While it is possible to provide differentiation circuitry for use with ordinary generating systems having a permanent magnet and a pickup coil, which will nullify the nonlinearity with frequency dependence of the output amplitude (i.e., eliminate the constancy of the $U_0$ term or multiplier of the frequency-dependent term), we prefer to make use of signal generators in which the output is solely a function of frequency as defined by the expression $U = U_0 \sin \phi$ or $U = U_0 \cos \phi$. According to the present invention, this is accomplished by providing two magnetically affectable members with a 90° angular offset and having a resistivity or conductivity which is a function of the magnetic flux therethrough. One such device is a Hall-effect crystal which is energized orthogonally with an electric current and a magnetic flux and produces an output, taken at right angles, to both the electric and magnetic fields which is a function of the variable input. The other such device is a magnetoresistance in which the ohmic resistance varies linearly as a function of the flux traversing same.

DESCRIPTION OF THE DRAWING

The above object and features of our invention will be described in the following, with reference to the drawing in which:

FIG. 3 is a block diagram of the logic circuit energized by the outputs from the generator of FIG. 2;

FIG. 4 is a diagram of a braking-force regulator for an automotive vehicle using the principles of the present invention;

SPECIFIC DESCRIPTION

As indicated earlier, one of the important aspects of the present invention is the provision of a new generating system for producing output signals which can be used to control a vehicle braking-force regulator. The system of the invention uses a generator having a magnetic member respresented diagrammatically at 9a in FIG. 2. When this magnetic member constitutes a Hall-effect crystal and has a prismatic configuration so that an electric field can be applied by a constant-current generator 100 across two faces of the crystal (arrow A), a magnetic flux $\Phi$ may be applied between two other opposing faces at right angles to the electric field. As a result, a potential difference U may be tapped at terminals connected to another pair of opposing faces as a result of the field created at right angles to the applied electric field and the applied magnetic field. When either of these fields is constant, the output U is a function of the other. Hence, where a constant-current source is used, the output U is a function of the magnetic flux and, as noted earlier, varies with frequency and only with frequency. Hence the output $U = U_o \sin \omega t \cdot U_o$ is determined by the constant current traversing the crystal and is not a function of frequency.

Figure 2:
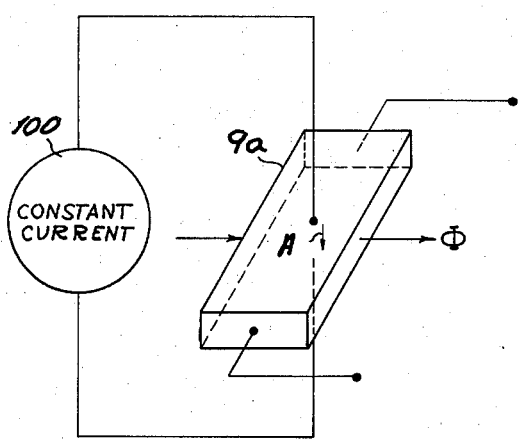
FIG. 2 is a diagram showing the principles of the Hall-effect generator.

In the system of FIG. 4, the motor vehicle wheel 21 is connected via a shaft 12 to a magnetic yoke 101 whose pole pieces 102 and 103 establish a radial magnetic field between them. Within this field, and substantially coplanar therewith are the magnetic members 9a and 10a of a pair of sinewave generators 9 and 10, the outputs $U_1$ and $U_2$ of which are exclusively a function of frequency as described earlier. The magnetic members 9a and 9b are energized from a constant-current source as shown in FIG. 2, and operate in accordance with the principles of the Hall effect.

Figure 6:
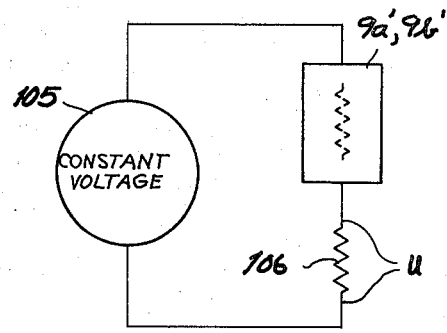
FIG. 6 is a circuit diagram illustrating the connection of the magnetic member of such a device.
Figure 5:
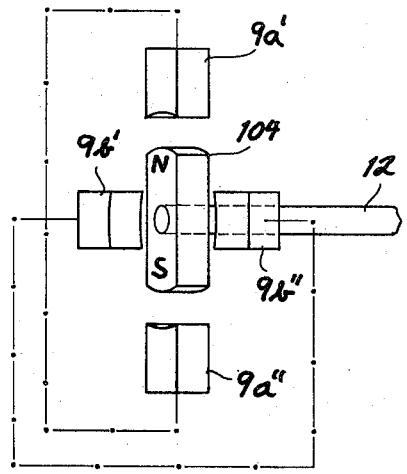
FIG. 5 is a diagram showing a signal generator using magnetoresistance devices.

In FIG. 5, we show another system which can be used for the sinewave generators 9 and 10. In this embodiment, a permanent magnet 104 is carried by the shaft 12 and is rotated between two diametrically opposed pairs of magnetoresistances 9a', 9a'' and 9b', 9b'', interconnected by a magnetic yoke represented in dot-dash lines. As indicated in FIG. 6, each of the magnetoresistances 9a', 9b' is connected in series with a constant voltage source 105 and a load resistor 106 across which the potential U is developed. When a magnetic field modifies the ohmic resistance of the members 9a', etc. the change in resistance is reflected in a variation of the current flow in the circuit of FIG. 6 and hence a modification of the voltage drop across resistor 106. Here again, $U = U_o \sin \omega t$.

The output of these generators 9 and 10 is fed into a logic circuit 1 which combines them according to principles described below and computes the angular acceleration $\alpha$ of the wheel 21. The output of the logic circuit 1 is fed into a valve arrangement 23 which controls the braking pressure in the brake line between a master cylinder 24 and a wheel brake 22. Thus braking is carried out as a function of the angular acceleration $\alpha$ of the wheel 21 to avoid locking of the wheel 21 and therefore inefficient braking.

Figure 1:
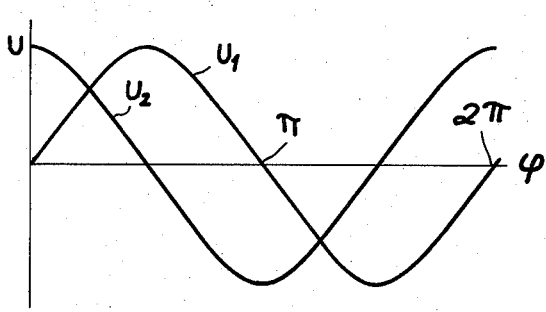
FIG. 1 is a graph showing the relationship between the sinewave output signals prior to differentiation according to the principles of the present invention.

FIG. 1 is a graph showing output signals $U_1$ and $U_2$ plotted along the ordinate in terms of an amplitude (e.g., voltage, current) against the angular displacement (plotted along the abscissa). As can be seen, the two sinewave signals $U_1$ and $U_2$ are 90° out of phase with one another. This known phase difference is the reference against which the angular acceleration $\alpha$ is measured.

In FIGS. 3, we show a logic circuit connected between the braking-force regulator valve 23 and the sinewave genrators 9, 10 which produce signals $$U_1 = U_o \sin \omega t \text{ or } U_1 = U_o \sin \phi \tag{1}$$

and $$U_2 = U_o \cos \omega t = U_o \cos \phi \tag{2}$$

The inputs $U_1$ and $U_2$ are applied to respective differentiators 13, 14, yielding the first time derivatives:

$$\dot{U}_1 = U_o \cos \phi \cdot \dot{\phi} \tag{3}$$

and $$\dot{U}_2 = -U_o \sin \phi \cdot \dot{\phi} \tag{4}$$

where $$\dot{\phi} = d\phi/dt \tag{5}$$

The signals $\dot{U}_1$ and $\dot{U}_2$ are respectively applied to differentiators 15 and 16 which generate the functions:

$$\ddot{U}_1 = U_o \cdot \ddot{\phi} \cdot \cos \phi - U_o(\dot{\phi})^2 \cdot \sin \phi \tag{6}$$

$$\ddot{U}_2 = -U_o \cdot \ddot{\phi} \cdot \sin \phi - U_o(\dot{\phi})^2 \cdot \cos \phi \tag{7}$$

where $$\ddot{\phi} = d^2\phi/dt^2 \tag{8}$$

For convenience and to avoid confusion, the constant $U_o$ can be replaced by the constant $m$.

In the next stage, the products $\ddot{U}_1 \cdot U_2$ and $U_1 \cdot \ddot{U}_2$ can be formed in accordance with the relationships:

$$\ddot{U}_1 \cdot U_2 = [-m^2 \cdot \ddot{\phi} \cdot \cos^2\phi - m^2(\dot{\phi})^2 \sin \phi \cdot \cos \phi] \tag{9}$$

$$U_1 \cdot \ddot{U}_2 = [-m^2 \cdot \ddot{\phi} \cdot \sin^2\phi - m^2(\dot{\phi})^2 \sin \phi \cdot \cos \phi] \tag{10}$$

The multiplication is carried out in multipliers 17 and 18, the outputs of which are applied to an algebraic adder 19 in which the subtractive combination is made:

$$\ddot{U}_1 \cdot U_2 - \ddot{U}_2 \cdot U_1 = m^2 \ddot{\phi} (\sin^2 \phi + \cos^2 \phi) \tag{11}$$

since:

$$\sin^2 \phi + \cos^2 \phi = 1, \tag{12}$$

one obtains:

$$\ddot{U}_1 \cdot U_2 - U_1 \cdot \ddot{U}_2 = m^2 \cdot \ddot{m}^2 \tag{13}$$

The two signals $U_1$ and $U_2$ from the generators 9 and 10 are each differentiated twice in differentiators 13, 15 and 14, 16 respectively. These second time derivatives $\ddot{U}_1$ and $\ddot{U}_2$ are fed into multipliers 17 and 18 to produce the respective product signals $\ddot{U}_1 \cdot U_2$ and $U_1 \cdot \ddot{U}_2$. An adder 19 subtracts the latter of these two products from the former and yields a signal equal to the equation (13) and, therefore, proportional to the angular acceleration.

Although our invention has been shown with particular reference to a motor-vehicle brake system, it can be equally used in any system requiring means for accurately measuring angular acceleration. Furthermore, while the use of a-c voltage generators 9 and 10 in the system is desirable, generators producing a sine-wave resistance or current signals are also usable.

The improvement described and illustrated is believed to admit of many modifications within the ability of persons skilled in the art, all such modifications

We claim:

1. A method of operating an acceleration-responsive device having a rotatable body, a permanent magnet in step with said body and two magnetic members positioned with 90° angular offset and affected by the magnetic field of said permanent magnet, said method comprising the steps of:

energizing said magnetic members with a substantially constant electrical signal to cause said magnetic members to produce sinuosidal output signals $U_1 = U_0 \sin \omega t$ and $U_2 = U_0 \cos \omega t$ consituting functions solely of the angular velocity of said permanent magnet upon rotation thereof at an angular velocity $\omega$, said signals $U_1$ and $U_2$ being in 90° out-of-phase relationship and $U_0$ being a frequency-independent value;

generating at least the second time derivative $\ddot{U}_1$ and $\ddot{U}_2$ of the signals $U_1$ and $U_2$, respectively; and combining said signals in accordance with the relationship $m^2 \ddot{\phi} = \ddot{U}_1 \cdot U_2 - \ddot{U}_2 \cdot U_1$, where $m^2$ is a constant.

2. The method defined in claim 1 wherein the output signals $U_1$ and $U_2$ are differentiated to yield signals $\dot{U}_1$ and $\dot{U}_2$ representing, respectively, the first time derivatives of said signals $U_1$ and $U_2$, and each of said signals $\dot{U}_1$ and $\dot{U}_2$ is individually differentiated to produce the second time derivatives.

3. The method defined in claim 2 wherein said members are Hall-effect crystals, wherein the energizing step comprises passing a constant-current through each of said crystals in one direction, said crystals being subjected to said magnetic field in a direction orthogonal to said one direction, and said signals $U_1$ and $U_2$ being derived across said crystals in a further direction orthogonal to both of the previously mentioned directions.

4. The method defined in claim 2 wherein said members are magnetoresistances, further comprising the step of applying a constant voltage across each of said members in series with a load resistor and tapping the signals $U_1$ and $U_2$ from across said load resistor.

5. A system for operating an acceleration-responsive device in accordance with the angular acceleration of a rotating body, comprising a rotor connected with said body, a pair of magnetic members angularly offset by 90° and means for energizing said member with a constant electrical signal, said members cooperating with said rotor upon energization by said constant electrical signal to generate outputs $U_1$ and $U_2$ in the form of sinusoidal signals in 90° out-of-phase relationship and of a frequency constituting solely a function of the angular volocity of a magnetic field traversing said members but of an amplitude dependent upon the orientation of said magnetic field but independent of said frequency; permanent magnet means connected to said body and rotatable therewith for producing a magnetic field traversing said members; and means for producing signals $\ddot{U}_1$ and $\ddot{U}_2$ representing the second time derivatives of the signals $U_1$ and $U_2$, respectively; and means for combining said signals in accordance with the relationship $m^2 \ddot{\phi} = \ddot{U}_1 \cdot U_2 - \ddot{U}_2 \cdot U_1$ where $m^2$ is a constant.

6. The system defined in claim 5 wherein said members are Hall-effect crystals, said means for energizing comprising means for passing a constant current through each of said Hall-effect crystals in one direction, said crystals being subjected to said magnetic field in a direction orthogonal to said one direction, and said signals $U_1$ and $U_2$ being tapped across said crystals in a further direction orthogonal to the two mentioned directions.

7. The system defined in claim 5 wherein said members are magnetoresistances, said means for energizing comprising a source of constant potential and a load resistor connected in series with each of said members across said source; said signals $U_1$ and $U_2$ being tapped across said resistors.

8. The system defined in claim 5 where said means for producing said signals $\ddot{U}_1$ and $\ddot{U}_2$ includes first differentiator means for producing signals $\dot{U}_1$ and $\dot{U}_2$ representing respectively the first-time derivatives of the signals $U_1$ and $U_2$, and respective differentiators supplied with the signals $\dot{U}_1$ and $\dot{U}_2$.

9. The system defined in claim 8 wherein the means for combining said signals in accordance with said relationship is an algebraic summer.

10. The system defined in claim 9 wherein said device is an antiskid brake-control system for an automotive vehicle.

* * * * *